United States Patent
Jung et al.

(10) Patent No.: US 8,896,920 B2
(45) Date of Patent: Nov. 25, 2014

(54) REFLECTIVE POLARIZER INCLUDING GRIDS WITH NANOPARTICLES AND RESIN MATERIAL

(71) Applicant: LG Chem, Ltd., Seoul (KR)

(72) Inventors: Jin Mi Jung, Daejeon (KR); Jae Jin Kim, Daejeon (KR); Jong Byung Lee, Daejeon (KR); Bu Gon Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/047,360

(22) Filed: Oct. 7, 2013

(65) Prior Publication Data

US 2014/0036200 A1    Feb. 6, 2014

Related U.S. Application Data

(63) Continuation of application No. PCT/KR2012/011027, filed on Dec. 17, 2012.

(30) Foreign Application Priority Data

Dec. 15, 2011 (KR) .......................... 10-2011-0135457
Dec. 17, 2012 (KR) .......................... 10-2012-0147584

(51) Int. Cl.
*G02B 5/30* (2006.01)
*G02F 1/1335* (2006.01)

(52) U.S. Cl.
CPC ................. *G02F 1/133536* (2013.01)
USPC .................. 359/485.05; 359/489.06

(58) Field of Classification Search
None
See application file for complete search history.

(56) References Cited

U.S. PATENT DOCUMENTS

2010/0007827 A1*   1/2010   Nishimura et al. ........... 349/117

FOREIGN PATENT DOCUMENTS

| KR | 10-2008-0046016 A | 5/2008 |
|---|---|---|
| KR | 10-2009-0071328 A | 7/2009 |
| KR | 10-2009-0123418 A | 12/2009 |
| KR | 10-2011-0024079 A | 3/2011 |

* cited by examiner

*Primary Examiner* — Arnel C Lavarias
(74) *Attorney, Agent, or Firm* — McKenna Long & Aldridge, LLP

(57) ABSTRACT

A reflective polarizer, a method of manufacturing a reflective polarizer, an optical element, and a display device are provided. The reflective polarizer may have excellent thermal and physical durability even when exposed to a light source and external friction. In addition, the method for manufacturing a reflective polarizer may provide a large-sized reflective polarizer without using expensive equipment.

14 Claims, 5 Drawing Sheets ents in addition to the polarizers.
REFLECTIVE POLARIZER INCLUDING GRIDS WITH NANOPARTICLES AND RESIN MATERIAL This application is a Continuation Bypass Application of International Patent Application No. PCT/KR2012/011027, filed Dec. 17, 2012, and claims the benefit of Korean Patent Application Nos. 10-2011-0135457, filed Dec. 15, 2011, and 10-2012-0147584, filed Dec. 17, 2012, in the Korean Intellectual Property Office, the disclosures of which are incorporated herein by reference.

TECHNICAL FIELD

The present application relates to a reflective polarizer, a method of manufacturing the same, an optical element, and a display device.

BACKGROUND ART

A liquid crystal display (LCD) may include a liquid crystal panel and polarizers disposed on or under the liquid crystal panel, and also include various functionalized optical elements in addition to the polarizers.

The LCD may display images by changing orientation of liquid crystals by pixels of the liquid crystal panel. Since the LCD is not a self-emissive element, it conventionally has a light source such as a backlight unit (BLU) on the underlying polarizer of the liquid crystal panel, and displays images by transmitting light emitted from the light source through the panel.

DISCLOSURE

Technical Problem

The present application is directed to providing a reflective polarizer, a method of manufacturing the same, an optical element, and a display device.

Technical Solution

One aspect of the present application provides a reflective polarizer, which includes a resin layer. The reflective polarizer may increase light use efficiency in a display device by linearly polarizing light in a visible region, and reflecting light reflected without being incident to the reflective polarizer, to be re-incident to the reflective polarizer. Hereinafter, the reflective polarizer will be described in detail with reference to the accompanying drawings.

FIG. 1 is a schematic cross-sectional view of a reflective polarizer 100 according to an exemplary embodiment of the present application, and FIG. 2 is a schematic cross-sectional view of a reflective polarizer 100 according to another exemplary embodiment of the present application. As shown in FIGS. 1 and 2, the reflective polarizer 100 may include a resin layer 120.

In one example, the resin layer 120 may have a refractive index of 1.1 to 2.0.

Also, in one example, the resin layer 120 may include a binder resin, for example, a curable resin in a cured state. As a resin that can be used as the curable resin, for example, various room temperature-curable, moisture-curable, heat-curable, and photocurable resin compositions, preferably heat-curable and photocurable resin compositions, and more preferably a photocurable resin composition may be used. The "cured state" used herein may refer to the state in which a resin composition is converted in a hard state by crosslinking or polymerizing components included in the resin composition. In addition, the "room temperature-curable, moisture-curable, heat-curable, or photocurable resin composition" may refer to a composition that can be cured at room temperature, in the presence of suitable moisture, by application of heat, or by radiation of electromagnetic waves such as UV rays.

In one example, the resin composition may include an acrylic compound, an epoxy compound, a urethane-based compound, a phenol-based compound, or a polyester-based compound as a main material. Here, the "compound" may be a monomeric, oligomeric, or polymeric compound.

In one example, as the resin composition, an acrylic resin composition having excellent optical characteristics such as transparency and excellent resistance to yellowing, and preferably a UV-curable acrylic resin composition may be used.

The UV-curable acrylic resin composition may include an acrylate oligomer and a diluting monomer, and as needed, to ensure hardness, a multifunctional acrylate may be used as the diluting monomer. Here, as an acrylate oligomer, urethane acrylate, epoxy acrylate, ester-based acrylate, or ether-based acrylate, and preferably urethane acrylate may be used. Various acrylate oligomers to prepare a UV-curable composition are known in the art, and such a compound may be suitably selected in the present application.

Various kinds of the diluting monomers that can be used in preparation of the UV-curable acrylic resin composition are known in the art, and as an example, multifunctional acrylate may be used, but the kind of the diluting monomer is not limited thereto. The multifunctional acrylate may be a bifunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol(meth)acrylate, dimethylol dicyclopentane di(meth)acrylate, ethyleneoxide-modified hexahydrophthalic acid di(meth)acrylate, tricyclodecane dimethanol (meth)acrylate, neopentylglycol-modified trimethylpropane di(meth)acrylate, adamantane di(meth)acrylate, or 9,9-bis[4-(2-acryloyloxyethoxy)phenyl]fluorine; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane(meth)acrylate, or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; or a hexafunctional acrylate such as dipentaerythritol hexa(meth)acrylate, caprolactone-modified dipentaerythritol hexa(meth)acrylate, or urethane(meth)acrylate (e.g. a reaction product of an isocyanate monomer and trimethylolpropane tri(meth)acrylate, UA-306I or UA-306T produced by Kyoeisha), and to ensure hardness of the resin layer 120, a tetra or higher functional acrylates, preferably, a hexa or higher functional acrylate is used, but the present application is not limited thereto.

The kind or combination ratio of the selected components to prepare the UV-curable acrylic resin composition is not particularly limited, and may be controlled in consideration of desired hardness and other physical properties of the resin layer 120.

In addition, in the resin composition, as needed, an additive such as a polymerization initiator, a UV blocking or absorbing agent, a discharge preventing agent, or a dispersing agent may be suitably included.

In one example, the resin layer 120 of the reflective polarizer 100 may have a concave portion 121 and a convex portion 122, which are forming a grid on the resin layer 120 as shown in FIG. 1. Here, the convex portion 122 may include particles 130 and the above-described curable resin. For example, the particles 130 may be self-assembled, have a predetermined pore in the curable resin in a cured state, and dispersed in the convex portion 122. The term "grid" used herein refers to an embossing structure having at least two grooves at regular intervals in a planar surface, so that stripe-shape patterns having a plurality of concave portions 121 and convex portions 122 are arranged parallel to each other. In addition, the term "self-assembly" used herein refers to a phenomenon exhibiting a new physical property by forming a ultra-molecule in which molecules are voluntarily collected due to an interaction between molecules of the particles, for example, attractions such as the Van der Waals force, capillary force, π-π interaction, a hydrogen bond, that is, a molecular aggregate without applying specific energy to the particles, and by forming a structure in which an arranged domain (building block) having a molecule size or more is present, for example, a nanostructure. Here, the nanostructure is a nano-sized structure, for example, a nanowire structure, a nanoribbon structure, or a nanobelt structure. As described above, as the self-assembled particles 130 are included in the convex portion 122, the convex portion 122 has a nanostructure in which the particles 130 are immobilized by an interaction, so that the reflective polarizer 100 may have excellent thermal and physical durability even when exposed to a light source and external friction.

Here, a porosity of the convex portion 122 represented by Equation 1 may be, for example, 5 to 50%, 10 to 30%, or 20 to 50%.

$$\text{Porosity}(P) = (V_1 - V_2)/V_1 \times 100 \quad \text{[Equation 1]}$$

In Equation 1, $V_1$ represents a total volume of the convex portion 122, and $V_2$ is a volume of the convex portion 122, which is occupied by the particles 130.

The term "porosity" used herein refers to a volume ratio of a part (hereinafter, referred to as a pore) of the convex portion 122 of the resin layer 120, which is not occupied by the particles 130. That is, as the pores are reduced in the convex portion 122 of the resin layer 120, the volume ratio of the particles 130 is increased. In this case, according to a decreased porosity, loss of the optical characteristics due to the pore is relatively reduced. When the porosity is less than 5%, it is difficult to realize in a process, and when the porosity is more than 50%, there are too many pores, and thus the loss of the optical characteristics is increased. In one example, when the particles 130 are all spherical and have the same size, the porosity of the particles 130 in the convex portion 122 may be, for example, 26 to 48%, or 28 to 30%.

In one example, the particles 130 included in the convex portion 122 of the resin layer 120 may have a diameter of 2 to 100 nm, for example, 10 to 80, 30 to 90, or 20 to 50 nm. When the diameter of the particle 130 is less than 2 nm or more than 100 nm, the particles 130 may be attached to an entire surface of the resin layer 120, not only the convex portion 122 of the resin layer 120.

The particles 130 are not particularly limited as long as they have low absorbability in the visible region, and may be, for example, metal particles such as silver (Ag) particles, copper (Cu) particles, chromium (Cr) particles, platinum (Pt) particles, gold (Au) particles, nickel (Ni) particles, palladium (Pd) particles, tungsten (W) particles, iridium (Ir) particles, molybdenum (Mo) particles, iron (Fe) particles, titanium (Ti) particles, chromium (Cr) particles, cobalt (Co) particles, or aluminum (Al) particles, or an alloy thereof, and in one example, platinum, gold, silver and aluminum or an alloy thereof, and preferably, silver or aluminum particles, but the present application is not limited thereto. The particles 130 may have excellent electrical conductivity and optical performance, and for example, aluminum particles rarely absorb light in the visible region, and have very excellent polarization degree and reflective characteristics.

The particles 130 may be formed in a spherical, pyramid (tetrahedral), cubic (hexagonal), or polygonal shape close to a spherical shape. Alternatively, the particles 130 may be formed in a disc, oval, or rod shape, but the present application is not particularly limited thereto.

In addition, in one example, the particles 130, as shown in FIGS. 3 and 4, may have a core-shell structure. For example, the particles 130 may include a core 131 including a metal or metal alloy, and a shell 132 which is present at an outside of the core 131 and includes an organic compound, a metal oxide, or a different metal or metal alloy from that of the core 131. As described above, when the particles 130 have a core-shell structure, surface characteristics of the particles may be controlled not to generate agglomeration or condensation between particles in the shell 132 part.

In one example, the organic compound may be a ligand or polymer compound binding to the outside of the core 131.

Here, the ligand may be, but is not limited to, at least one selected from oleic acid, stearic acid, palmic acid, 2-hexadecanone, 1-octanol, Span 80, dodecylaldehyde, 1,2-epoxydodecane, 1,2-epoxyhexane, arachidyl dodecanoate, octadecylamine, silane, alkanethiol (HS(CH$_2$)$_n$X, X=CH$_3$, —OH, —COOH), dialkyl disulfide (X(CH$_2$)$_m$S—S(CH$_2$)$_n$X), and dialkyl sulfide (X(CH$_2$)$_m$S(CH$_2$)$_n$X), and preferably, oleic acid and stearic acid.

The polymer compound may be, but is not limited to, at least one selected from fluoropolymer, polyethylene glycol, polymethylmethacrylate, polylactic acid, polyacrylic acid, polysulfide, polyethylene oxide, and a block copolymer and nitrocellulose including at least one functional group, and preferably polyethylene glycol.

As shown in FIG. 1, the resin layer 120 of the reflective polarizer 100 may have a grid structure including embossment having a concave portion 121 and a convex portion 122, and in the grid structure, the convex portion 122 may have a pitch of 30 to 300 nm, for example, 50 to 200, 30 to 150, 130 to 300, or 100 to 180 nm. When the pitch of the convex portion 122 is in the above range, the manufactured reflective polarizer 100 may have excellent polarization extinction ratio and transmission rate with respect to the visible and UV wavelength bands. The term "polarization extinction ratio" used herein refers to a ratio of a transmission rate with respect to P polarization to a transmission rate with respect to S polarization in a certain wavelength. As the polarization extinction ratio increases, a polarization separation element has an excellent polarization separation capability. Here, the "S polarization" refers to a component having an electromagnetic field vector parallel to the grid in light incident to the reflective polarizer 100, and the "P polarization" refers to a component having an electromagnetic field vector perpendicular to the grid in the incident light. In addition, the "pitch (P)" refers to a distance obtained by adding a width (W) of the concave portion 121 and a width of the convex portion 122.

In addition, in the structure, a ratio (W/P) of the width (W) of the convex portion 122 to the pitch (P) of the convex portion 122 may be 0.15 to 0.8, and for example, a pattern pitch may be 0.35 to 0.65, 0.15 to 0.5, or 0.5 to 0.8. When the ratio (W/P) of the width (W) of the convex portion 122 to the pitch (P) of the convex portion 122 is in the above-described range, the manufactured reflective polarizer 100 may have an excellent polarization separation capability with respect to the visible and UV wavelength bands.

A ratio (H/P) of a height (H) of the convex portion 122 to the pitch (P) of the convex portion 122 may be 0.5 to 2, for example, 0.8 to 1.2, 1.0 to 1.8, or 1.3 to 1.5. When the ratio (H/P) of the height (H) of the convex portion 122 to the pitch (P) of the convex portion 122 is less than 0.50, the transmission rate for the S polarization is relatively increased, thereby decreasing the polarization extinction ratio, and when the ratio (H/P) of the height (H) of the convex portion 122 to the pitch (P) of the convex portion 122 is more than 2, the transmission rate for the P polarization is relatively decreased, thereby decreasing the polarization extinction ratio. In addition, the term "height" used herein refers to the height (H) of the convex portion 122.

In one example, a dielectric material may be present in the concave portion 121 of the embossment. An exemplary dielectric material may have a refractive index of 1.1 to 2.0 with respect to light having a wavelength of 400 to 800 nm. The dielectric material may be a complex or air of one or at least two selected from the group consisting of titanium oxide, cerium oxide, zirconium oxide, aluminum oxide, yttrium oxide, silicon oxide, silicon nitride, and aluminum nitride, but the present application is not particularly limited as long as the dielectric material has a refractive index in the above-described range. In one example, when the dielectric material is air, the concave portion 121 of the embossment may be a substantially empty space, and as to be described below, when a protective layer is further included on the embossment, the protective layer may include a dielectric material.

In one example, the reflective polarizer 100 may further include a substrate 110. The substrate 110 serves to support the resin layer 120, and a material for the substrate 110 is not limited as long as it maintains pressure-sensitive adhesiveness to a curable resin for forming the resin layer 120 after being cured. For example, a hard substrate such as a quartz or glass substrate or a soft substrate such as a polymer substrate may be used, and specifically, a substrate formed from a material such as quartz, glass, polyvinyl alcohol, polycarbonate, an ethylene vinyl acetate copolymer, polyethyleneterephthalate (PET), polymethyl methacrylate (PMMA), polyvinyl chlroride (PVC), polystyrene (PS), polyestersulfone (PES), polyether ether ketone, or polydimethylsiloxane (PDMS) may be used. The substrate 110 may have a transmission rate of, for example, 85 or 90% or more with respect to light having a wavelength from 400 to 800 nm.

The reflective polarizer 100 may also include, as shown in FIG. 2, a protective layer 140 formed on the convex portion 122 to protect the resin layer 120. The protective layer 140 is not particularly limited, as long as it is formed of a material exhibiting a light transmission property without changing a polarizability of transmitted light. For example, the material may be a curable resin composition, and preferably, the above-described UV-curable resin composition. For example, the UV-curable resin may be, but is not limited to, a resin photopolymerized by adding a polymerization initiator to an acrylate-based oligomer such as an epoxy acrylate-based, polyester acrylate-based, urethane acrylate-based, polybutadiene acrylate-based, silicon acrylate-based, or alkyl acrylate-based oligomer. Furthermore, the protective layer 140, as described above, may include a dielectric material.

In one example, the protective layer 140 may have a refractive index of 1.1 to 2.0.

Another aspect of the present application provides a method of manufacturing the reflective polarizer. FIG. 5 is a schematic diagram illustrating an exemplary method of manufacturing the reflective polarizer.

As shown in FIG. 5, the exemplary method of manufacturing the reflective polarizer may include charging particles 230 in a concave portion 221 of a resin pattern layer 220 having the concave portion 221 and a convex portion 222, and coating a curable resin composition 240 on the resin pattern layer 220 charged with the particles 230. When the reflective polarizer is manufactured by the above method, the particles 230 are self-assembled and have a structure in which the particles 230 are immobilized to the convex portion of the prepared reflective polarizer by an interaction therebetween, and thus the reflective polarizer having an excellent polarization separation ability and excellent durability may be manufactured. In addition, in the present application, because of a method of primarily charging the particles 230 in the concave portion 221 of the resin pattern layer 220 formed on a first substrate without being directly patterned on a substrate to have an embossing pattern, and transferring the charged substrate to a second substrate 250, the particles 230 may be arranged on the second substrate 250 in an embossing pattern, so that a grid pattern formed by the self-assembly of the particles 230 may be freely controlled in a process.

As shown in FIG. 5, the resin pattern layer 220 having an embossing shape may be formed on the first substrate on which the particles 230 are coated, and the embossing shape may have the concave portion 221 and the convex portion 222. Here, the first substrate is not particularly limited, as long as it is a base having transparency, and may be a glass, quartz, or polymer substrate. Here, the polymer substrate may be, for example, formed of a resin such as polyvinyl alcohol, polycarbonate, an ethylene vinyl acetate copolymer, polyethyleneterephthalate (PET), polymethyl methacrylate (PMMA), polyvinyl chlroride (PVC), polystyrene (PS), polyestersulfone (PES), polyether ether ketone, or polydimethylsiloxane (PDMS).

Here, the embossed resin pattern layer 220 formed on the first substrate may be formed by forming a UV-curable resin layer by coating the above-described UV-curable resin composition on the first substrate, and forming the resin pattern layer 220 by patterning a reverse image of the pattern to be formed on the reflective polarizer on the UV-curable resin layer.

Here, as a method of coating the UV-curable resin composition, a coating method known in the art such as spin coating or slit coating may be used, but the present application is not limited thereto. In addition, as a method of patterning the UV-curable resin layer, various patterning methods known in the art such as optical interference lithography, electron beam lithography, or EUV lithography, and x-ray lithography may be used, but the present application is not limited thereto.

In the exemplary manufacturing method, as shown in FIG. 5, as a prior operation to transfer the particles 230 on the second substrate 250 in an embossing pattern, the particles 230 may be coated on the first substrate 210 having the resin pattern layer 220, and charged in the concave portion 221 of the resin pattern layer 220.

As a method of charging the particles 230 in the concave portion 221, for example, the particles may be charged in the concave portion 221 of the resin pattern layer 220 through coating methods well known in the art such as spin coating, bar coating, dip coating, dropping, screen printing, inkjet printing, slot coating, or spraying, but the present application is not particularly limited thereto. In addition, to charge the particles 230 only in the concave portion 221 of the resin pattern layer 220, wettability between a surface of the resin pattern layer 220 and a solution of the particles 230 or solvent volatility of the solution of the particles 230 may be suitably controlled.

In one example, the particles 230 may be controlled in terms of surface characteristics before charged in the concave portion 221 of the resin pattern layer 220. For example, the particles 230 may be formed to have a core-shell structure by 1) introducing a ligand on a surface of the particles 230, 2) treating a surface of the particles 230 with a polymer, or 3) forming a metal oxide layer having a thickness of 10 nm or less through slow oxidation or forming a metal layer different from the particles 230 on a surface of the particles 230. In addition, as needed, a surface characteristic of the particle 230 may be controlled using at least two of the above-described methods of controlling surface characteristics (the methods 1) to 3)) at the same time. As described above, by controlling the surface characteristics of the particles 230, agglomeration or condensation of the particles 230 may be minimized.

The exemplary manufacturing method may further include performing an etching process to remove the particles 230 charged in any places other than the concave portion 221 of the resin pattern layer 220 after the particles 230 are charged in the concave portion 221 of the resin pattern layer 220. However, when an average particle diameter of the particles 230 is controlled to 2 to 100 nm, the additional etching process may not be included, and in this case, economic feasibility of the process may be enhanced.

In one example, before the particles 230 are charged in the concave portion 221 of the resin pattern layer 220 and the curable resin layer is formed, plasticization of the charged particles 230 may be further performed. Here, burning conditions such as burning temperature and time may be suitably controlled according to the kind and size of the used particles 230, and generally, the burning may be performed in a temperature range at which the structure of the substrate is not damaged. When the above-described burning operation is further performed, a solvent or organic materials are removed between the charged particles 230, and the particles 230 are fused, thereby enhancing a charging degree and a reflectance of the particles 230.

As shown in FIG. 5, when the particles 230 are charged in the concave portion 221 of the resin pattern layer 220, a curable resin layer 240 may be formed on the resin pattern layer 220 charged with the particles 230. For example, the curable resin layer 240 may be formed by coating the above-described curable resin on the resin pattern layer 220 charged with the particles 230, and a coating method may be suitably selected from various coating methods known in the art such as spin coating, and slit coating, etc. according to the kind of the curable resin.

As the curable resin, as described above, a photocurable resin composition or a heat-curable resin composition may be used, and the curable resin composition is not particularly limited, as long as it has a light transmission property and does not change a polarization property of transmitted light.

Here, the curable resin layer 240 may have a thickness of, for example, 100 nm to 3 mm, 100 nm to 1 mm, or 100 nm to 5 μm. When the thickness of the curable resin layer 240 is less than 100 nm, it is difficult to stably transfer the pattern, and when the thickness of the curable resin layer 240 is more than 3 mm, light refraction and light absorption are increased in the curable resin layer 240, and an optical path gets longer, thereby significantly degrading optical characteristics to be realized in the reflective polarizer. Within the above-described range of thickness, transfer of the embossing pattern formed in the resin pattern layer 220 even with a small thickness may be stably achieved.

When the curable resin composition 240 is coated on the resin pattern layer 220 charged with the particles 230 as described above, since the curable resin composition 240 has excellent flowability before curing, a part of the curable resin composition 240 coated on the entire surface of the resin pattern layer 220 on the first substrate 210 fills a pore of the self-assembled particles 230, and then cured, thereby firmly immobilizing a structure formed by the self-assembled particles.

In one example, when the curable resin layer 240 is formed, before curing the curable resin layer 240, a second substrate 250 may be stacked on the coated curable resin. The second substrate 250 is not particularly limited as long as it is formed of a material that can have adhesiveness to the second substrate 250 after the curable resin is cured, and for example, may be a hard substrate such as a glass substrate or a soft substrate such as a polymer substrate.

In one example, the curable resin layer 240 and the second substrate 250 may be sequentially stacked on the resin pattern layer 220 charged with the particles 230, and then the curable resin may be cured. The curable resin may be cured by a curing method known in the art such as UV radiation according to the kind of the curable resin, but the present application is not particularly limited.

As shown in FIG. 5, in the manufacturing method of the present application, a peeling strength between the first substrate 210 and the resin pattern layer 220 or a peeling strength between the curable resin composition 240 and the resin pattern layer 220 may be controlled, thereby selecting a separated layer.

For example, as shown in FIG. 5 (e-2), after the curable resin is cured, the cured curable resin composition 240 may be separated from the resin pattern layer 220, thereby obtaining a reflective polarizer formed in the type shown in FIG. 1.

In addition, according to another embodiment of the present application, in the manufacturing method, after the curable resin layer 240 and the second substrate 250 are sequentially formed, the curable resin may be cured, and the resin pattern layer 220 may be separated from the first substrate 210, thereby obtaining a reflective polarizer formed in the type shown in FIG. 2. In this case, as the resin pattern layer 220 serves as a protective layer of the pattern layer including the particles 230, durability of the pattern layer including the particles 230 may be enhanced, and oxidation may be prevented. In addition, in the manufacture of the reflective polarizer, a process of forming a separate protective layer to enhance durability of the reflective polarizer and prevent oxidation is not required, so that costs and process efficiency may be improved.

Here, the peeling strength between the first substrate 210 and the resin pattern layer 220 or the peeling strength between the curable resin composition 240 and the resin pattern layer 220 may be controlled by, for example, controlling a porosity of the particles 230 charged in the concave portion 221 of the resin pattern layer 220. For example, the porosity of the particles 230 may be controlled to 35% or more, 35 to 50%, or 40 to 45%. When the porosity of the particles 230 is controlled to 35% or more, an amount of the curable resin included in the pattern layer including the particles 230 is relatively increased and the adhesiveness to the resin pattern layer 220 is increased, and thus it is possible to remove only the first substrate 210. In one example, as a method of controlling the porosity of the particles 230, for example, when the particles 230 are coated in the concave portion 221 of the resin pattern layer 220, it may be controlled such that a small content of the particles 230 are included in a coating solution including the particles 230.

According to the method of manufacturing a reflective polarizer of the present application, a complicated process such as a dry etching process or deposition process is not required, and a large-sized reflective polarizer may be easily manufactured. In addition, according to the method of manufacturing a reflective polarizer, an embossing pattern having a fine line width without a partition may be easily formed using self-assembly of the particles 230, and an embossing pattern may also be formed on a flexible substrate or a chemically-vulnerable polymer substrate.

Still another aspect of the present application provides an optical element. The optical element may include a base and the reflective polarizer formed on one surface of the base. In one example, the optical element may be used, for example, as a brightness-enhancing film to improve brightness of the display device.

Here, the base is not particularly limited as long as it is a film having a high light transmission rate without optical anisotropy. The transmission rate may be, for example, 85 or 90% or more. For example, when the base has optical anisotropy, the brightness of the display device may be reduced due to birefringence.

Still another aspect of the present application provides a display device 300 including a reflective polarizer 320, for example, a liquid crystal display (hereinafter, an LCD). The exemplary device 300 may include the reflective polarizer 320.

The reflective polarizer 320 may be used, for example, to produce linearly-polarized light from lights radiated from a light source 310. The reflective polarizer 320 may be placed, for example, between a display panel 330 and the light source 310 in the device such that the light radiated from the light source 310 is incident on the polarizer, and radiated to the display panel 330 through the polarizer 320.

As the polarizer 320, any one capable of generating linearly-polarized light from the light radiated from the light source 310 may be used without particular limitation. Such a polarizer 320 may be a glass plate disposed at the Brewster's angle or a wire grid polarizer.

FIG. 6 is a schematic diagram of the display device 300. As shown in FIG. 6, in one example, the LCD may further include the display panel 330 and the light source 310 disposed at one side of the display liquid crystal panel to light the display panel, and as described above, the reflective polarizer 320 may be disposed between the display panel and the light source. In addition, in this case, a gridded surface of the reflective polarizer may be disposed toward the light source.

In addition, as shown in FIG. 6, the LCD may further include an absorption-type polarizer 340 present between the display panel 330 and the reflective polarizer 320.

In one example, a light absorption axis of the absorption-type polarizer 340 may be disposed parallel to the grid of the reflective polarizer 320. In such a structure, the reflective polarizer 320 may transmit a part of light (P-polarized light) emitted from the light source 310 and deliver the transmitted light to the absorption-type polarizer 340, and the rest of the light (S-polarized light) may be reflected toward the light source 310. The light reflected to the light source 310 may be re-incident to a reflective plate, converted into light without a polarizing component in the re-reflecting operation, and then re-incident to the reflective polarizer 320. Accordingly, since the absorption-type polarizer 340 transmits only the P-polarized light, optical loss due to the absorption of the S-polarized light may be minimized. According to repetition of the above-described process, a brightness characteristic of the device 300 may be enhanced.

Parts and a structure of the LCD are not particularly limited as long as the LCD includes the reflective polarizer 320, and all of the descriptions disclosed in the art may be suitably applied.

Effects of Invention

A reflective polarizer may provide excellent thermal and physical durability even when exposed to a light source and external friction. In addition, according to a manufacturing method of the present application, a large-sized reflective polarizer may be manufactured without using expensive equipment.

Figure 1:
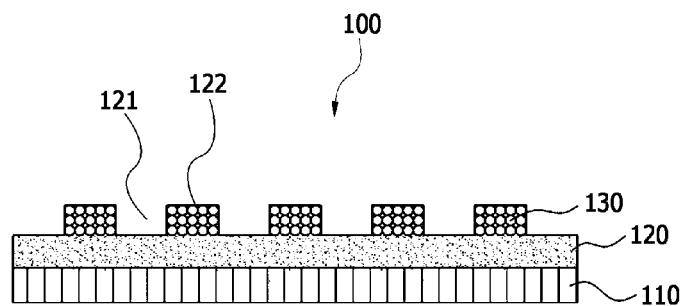
FIG. 1 is a cross-sectional view of a reflective polarizer according to an exemplary embodiment of the present application.
Figure 2:
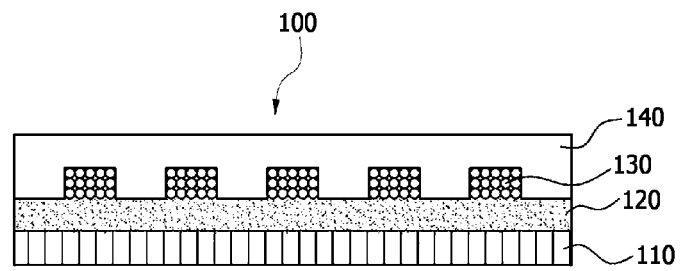
FIG. 2 is a diagram of a reflective polarizer according to another exemplary embodiment of the present application.
Figure 3:
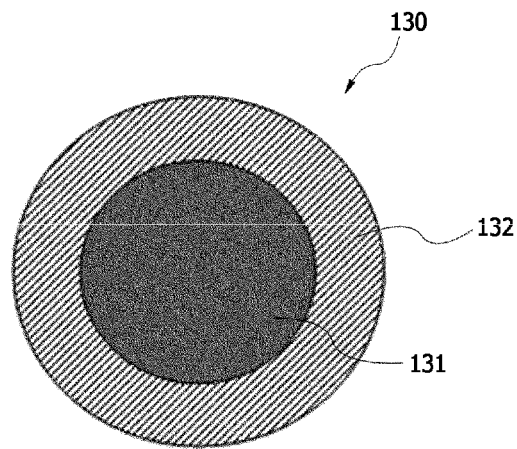
FIGS. 3 and 4 are diagrams of exemplary types of particles according to the present application.
Figure 4:
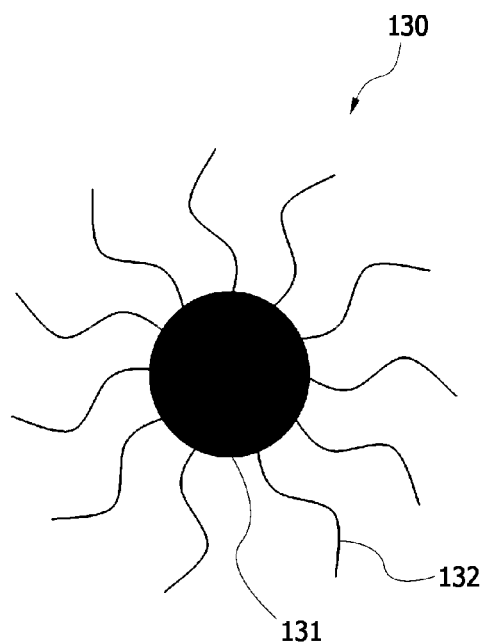
Figure 5:
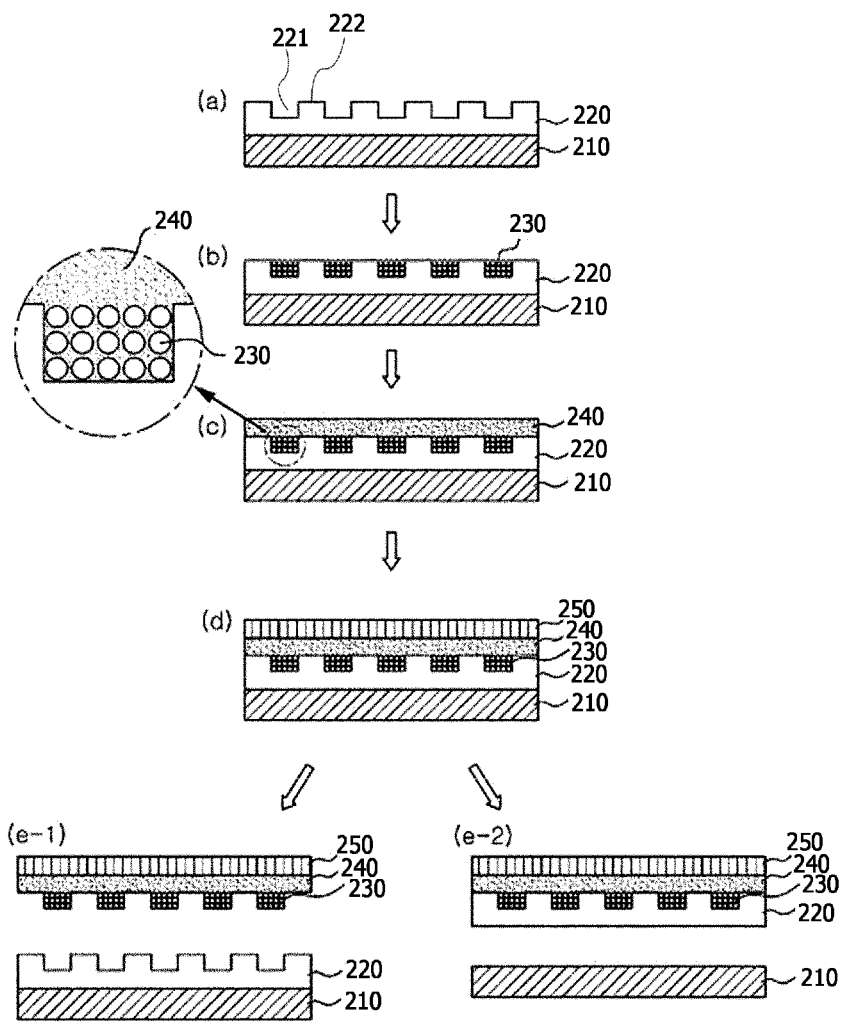
FIG. 5 is a diagram sequentially illustrating a method of manufacturing a reflective polarizer according to an exemplary embodiment of the present application.
Figure 6:
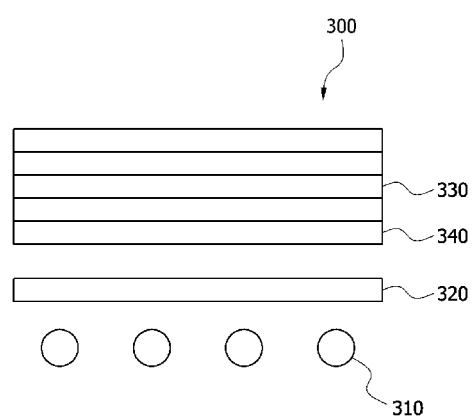
FIG. 6 is a schematic diagram of an exemplary display device according to an exemplary embodiment of the present application.

REFERENCE NUMERALS OF DRAWINGS 100, 320: reflective polarizer
110: substrate
120: resin layer
121, 221: concave portion
122, 222: convex portion
130, 230: particle
131: core, 132: shell
140: protective layer
210: first substrate
220: resin pattern layer
240: curable resin layer
250: second substrate
300: display device
310: light source
330: display panel
340: absorption-type polarizer

MODES FOR INVENTION

Though the present application will be described in more detail with reference to Examples and Comparative Example below, the scope of a reflective polarizer of the present application is not limited to the following Examples.

Manufacture of Coating Solution in which Nano-Sized Particles are Dispersed

Preparation Example 1

Silver nanoparticles having an average particle diameter of 50 nm were dispersed in a solvent, ethanol, in a content of 3 wt %, and a coating enhancer, Glide410, was added in an amount of 0.05 wt %, thereby preparing a coating solution in which the silver nanoparticles were dispersed.

Preparation Example 2

A coating solution in which silver nanoparticles were dispersed was prepared by the same method as described in Preparation Example 1, except that the silver nanoparticles were dispersed in a solvent in a content of 1 wt %.

Manufacture of Reflective Polarizer

Example 1

Figure 7:
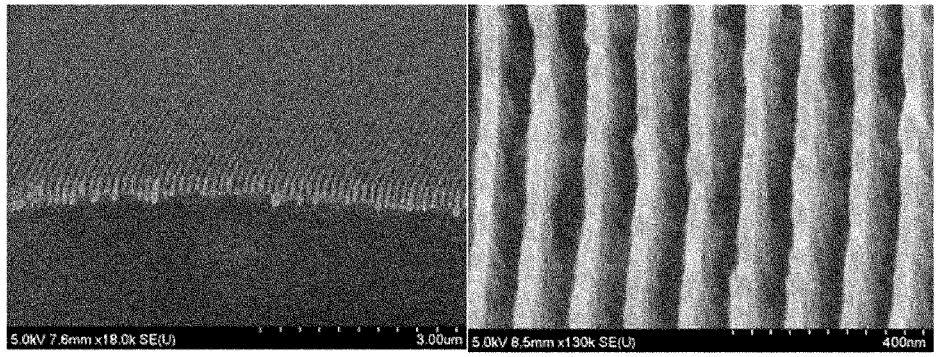
FIGS. 7 to 9 are SEM images of exemplary reflective polarizers manufactured according to Examples 1 and 2 and Comparative Example.

A photoresist was coated on a glass substrate, a gridded photoresist pattern having a pitch of 150 nm was formed through interference lithography using Nd-YAG 4th harmonic laser (266 nm). After forming the photoresist pattern, a part of the glass substrate was exposed by a dry etching process using argon gas. Subsequently, the exposed part of the glass substrate was etched using mixed gas prepared by mixing $CHF_3$ and $O_2$ gases in a ratio of 10:1, thereby manufacturing a gridded glass substrate having the same pitch as that of the photoresist pattern. A UV-curable polyurethane acrylate resin composition was coated on the grid of the manufactured glass substrate by spin coating at 500 rpm for 30 seconds. Afterward, a first substrate, a polycarbonate substrate (refractive index: 1.58), was laminated on the polyurethane acrylate resin composition, and irradiated with UV rays for 90 seconds, and the glass substrate was separated, and UV rays were radiated again for 90 seconds, thereby manufacturing a polycarbonate substrate having a polyurethane acrylate resin pattern layer having the same grid as that of the glass substrate. Afterward, the coating solution prepared in Preparation Example was spin-coated at 1000 rpm for 45 seconds using a spin coater to charge nanoparticles in a concave portion of the grid of the resin pattern layer, a solvent was completely dried at 75° C. for 5 minutes after coating, and the nanoparticles were coated. A UV-curable polyurethane acrylate resin composition was coated again on the dried substrate by spin coating at 500 rpm for 30 seconds, and a second substrate, a new polycarbonate substrate, was laminated on the polyurethane acrylate composition and cured by radiating UV rays, which were repeated. Afterward, the resin pattern layer and the cured polyurethane acrylate resin composition were separated from each other, thereby manufacturing a reflective polarizer having a pitch of 150 nm, in which a convex portion was charged with silver nanoparticles as shown in FIG. 7.

Example 2

Figure 8:
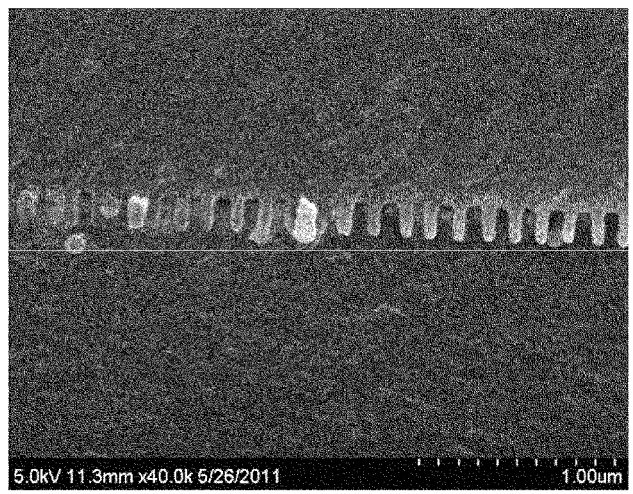

A reflective polarizer having a pitch of 150 nm, in which a convex portion was charged with silver nanoparticles, as shown in FIG. 8, was manufactured by the same method as described in Example 1, except that the coating solution prepared in Preparation Example 2 was coated on a resin pattern layer to charge nanoparticles in a concave portion of the grid of the resin pattern layer and dried, the UV-curable polyurethane acrylate resin composition was coated on the dried substrate, and the resin pattern layer was separated from a first substrate, which is the polycarbonate substrate, after UV curing. Here, ethanol was coated on a surface of the first substrate and dried to penetrate ethanol into a micropore of the polycarbonate, thereby controlling a peeling strength between the resin pattern layer and the first substrate to be weak.

Comparative Example

Figure 9:
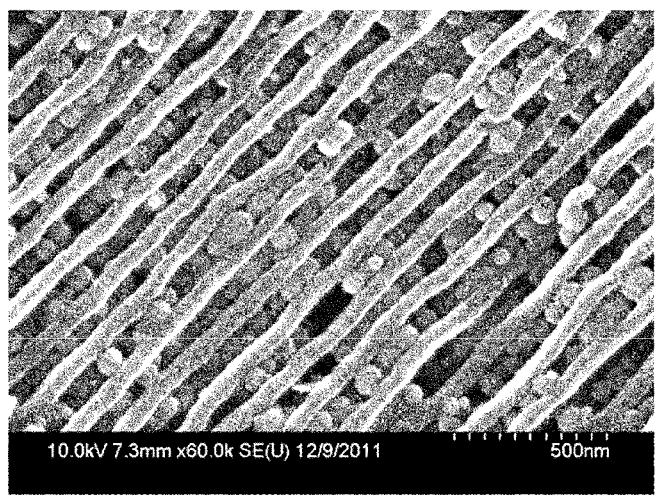

By the same method as described in Example 1, a polyurethane acrylate resin pattern layer having a pitch of 150 nm was formed on a first substrate, which is a polycarbonate substrate, nanoparticles was charged in a concave portion of a grid of the resin pattern layer by spin-coating the coating solution prepared in Preparation Example 1 at 1000 rpm for 45 seconds, a solvent was completely dried at 75° C. for 5 minutes after coating, and nanoparticles were coated, thereby manufacturing a reflective polarizer in which silver nanoparticles were charged in a concave portion of the resin pattern layer as shown in FIG. 9.

Experimental Example

Physical properties of the reflective polarizers manufactured in Examples 1 and 2 and Comparative Example were evaluated by the following methods:
Measurement of Transmission Rate According to Polarization A quartz polarizer produced by Moxtek (polarization degree: 0.99 or more) was placed on a UV-Vis spectrophotometer, and a transmission rate was specified to normalize, and then a transmission rate of the reflective polarizers of Example 1 and Comparative Example according to polarization by a method of measuring a transmission rate by placing the reflective polarizers of Example 1 and Comparative Example parallel or perpendicular to the quartz polarizer. The measurement results are shown in FIG. 10.

Figure 10:
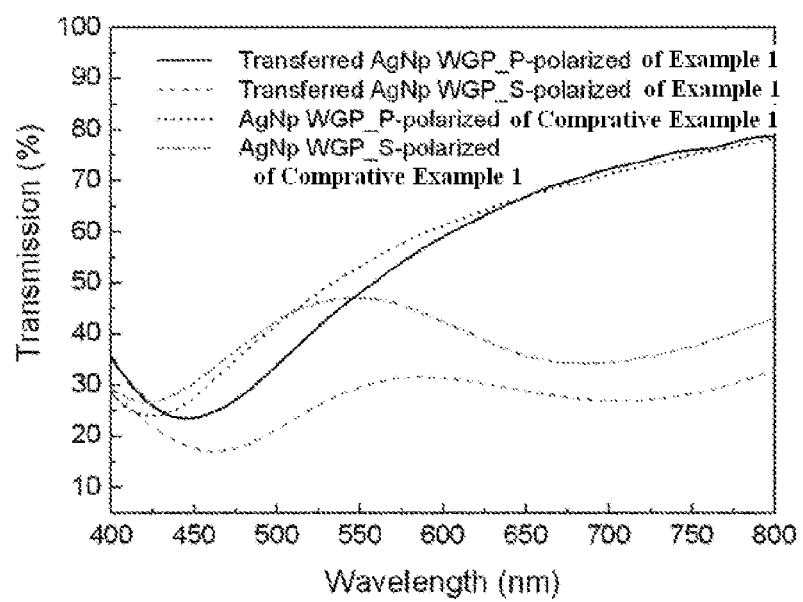
FIG. 10 is a graph of comparison of a polarizing characteristic of the reflective polarizers manufactured according to Example 1 and Comparative Example.

As shown in FIG. 10, compared to Comparative Example in which a concave portion of the resin pattern layer is simply charged with silver nanoparticles only by spin coating, the reflective polarizer having a grid structure including silver nanoparticles in a convex portion, which was manufactured in Example, had excellent polarization characteristics. That is, unlike Example, in Comparative Example, optical loss caused by absorption of light is partially generated in the resin layer formed of only a polyurethane acrylate resin. In addition, the concave portion of the reflective polarizer is charged with air (refractive index: 1) in Example, but it is formed of a resin material having a higher refractive index than air in Comparative Example, so that a pitch interval in the grid of the reflective polarizer is relatively increased, and the polarization degree of the reflective polarizer is degraded at the same wavelength.

The above-described polarization separation element of Example is merely provided as an example, and a reflective polarizer having an increased polarization degree can be manufactured by changing a charging degree or kind of nanoparticles.

The invention claimed is:
1. A reflective polarizer, comprising:
a resin layer; and a convex portion which comprises particles having an average particle diameter of 2 to 100 nm and which forms grids on the resin layer,
wherein a resin included in the resin layer is also present in the convex portion.

2. The polarizer according to claim 1, wherein the resin has a refractive index of 1.1 to 2.0.

3. The polarizer according to claim 1, wherein the convex portion has a porosity represented by Equation 1 of 5 to 50%:

$$\text{Porosity}(P) = (V_1 - V_2)/V_1 \times 100 \quad \text{[Equation 1]}$$

where $V_1$ represents a total volume of the convex portion, and $V_2$ represents a occupied volume by the particles in the convex portion.

4. The polarizer according to claim 1, wherein the particles are silver particles, copper particles, chromium particles, platinum particles, gold particles, nickel particles, palladium particles, tungsten particles, iridium particles, molybdenum particles, iron particles, titanium particles, chromium particles, cobalt particles, or aluminum particles, or an alloy of at least two thereof.

5. The polarizer according to claim 1, wherein the particles are core-shell particles each including a core including a metal or metal alloy, and a shell which is present at an outside of the core and includes an organic compound, a metal oxide, or a different metal or metal alloy from that of the core.

6. The polarizer according to claim 1, wherein the convex portion has a pitch of 50 to 200 nm.

7. The polarizer according to claim 6, a ratio (W/P) of a width (W) of the convex portion to a pitch (P) of the convex portion is 0.15 to 0.8.

8. The polarizer according to claim 6, a ratio (H/P) of a height (H) of the convex portion to a pitch (P) of the convex portion is 0.5 to 2.

9. The polarizer according to claim 1, further comprising a substrate,
wherein the resin layer is present on the substrate.

10. The polarizer according to claim 1, further comprising a protective layer present on the convex portion.

11. The polarizer according to claim 10, wherein the protective layer has a refractive index of 1.1 to 2.0.

12. An optical element, comprising:
a base; and
the reflective polarizer of claim 1, which is formed on at least one surface of the base.

13. A display device, comprising:
a display panel;
a light source lighting the display panel; and
the reflective polarizer of claim 1, which is disposed between the display panel and the light source.

14. The display device according to claim 13, further comprising an absorption-type polarizer presents between the display panel and the reflective polarizer,
wherein a light absorption axis of the absorption-type polarizer is disposed parallel to a grid of the reflective polarizer.

\* \* \* \* \*